April 7, 1959

J. D. EISLER ET AL 2,881,044

ELECTROGRAPHIC RECORDER

Filed Oct. 8, 1956

JOSEPH D. EISLER
CHARLES F. HADLEY
DANIEL SILVERMAN
INVENTORS.

BY Newell Pottorf

ATTORNEY

April 7, 1959

J. D. EISLER ET AL 2,881,044

ELECTROGRAPHIC RECORDER

Filed Oct. 8, 1956

TO PULSE AMPLIFIERS

JOSEPH D. EISLER
CHARLES F. HADLEY
DANIEL SILVERMAN
*INVENTORS.*

BY Newell Pottny

*ATTORNEY*

April 7, 1959  J. D. EISLER ET AL  2,881,044
ELECTROGRAPHIC RECORDER
Filed Oct. 8, 1956  4 Sheets-Sheet 3

JOSEPH D. EISLER
CHARLES F. HADLEY
DANIEL SILVERMAN
INVENTORS.

BY Newell Potter

ATTORNEY

April 7, 1959

J. D. EISLER ET AL 2,881,044

ELECTROGRAPHIC RECORDER

Filed Oct. 8, 1956

JOSEPH D. EISLER
CHARLES F. HADLEY
DANIEL SILVERMAN
  INVENTORS.

BY Newell Pottoy

ATTORNEY

United States Patent Office 2,881,044
Patented Apr. 7, 1959

2,881,044

ELECTROGRAPHIC RECORDER

Joseph D. Eisler, Charles F. Hadley, and Daniel Silverman, Tulsa, Okla., assignors to Pan American Petroleum Corporation, a corporation of Delaware Application October 8, 1956, Serial No. 614,398

8 Claims. (Cl. 346—34)

This invention relates to oscillographic recorders and is directed particularly to an inkless recorder for producing records on a non-photographic medium. More specifically, it is directed, but not limited, to the recording of multiple-trace records on relatively inexpensive, electrically sensitive paper on which the record becomes immediately visible. Such recording, wherein marking of the record medium is caused by the flow of electric current into or through the medium, has sometimes been called electrographic recording.

Photographic recording is undoubtedly the most commonly used method of making visible oscillographic records such as those obtained in seismic geophysical surveying. This has been true for a number of years in spite of the obvious drawbacks of greater cost of materials and time for chemically processing the recording medium to render the traces visible.

Direct-writing pen recorders using ink have generally been unable to replace photographic recording because they are limited to relatively low frequencies. Electrographic recording with styli arranged in a comb under which the recording medium passes has the disadvantage of presenting small-amplitude waves as a series of steps rather than smooth curves.

This particular disadvantage has been overcome in an electrographic recording system utilizing a multiplicity of styli on the edge of a rapidly rotating disk, past which the record strip, curved to maintain contact with the stylus tips, is drawn lengthwise. Since at least 10 or 20 dots per cycle of the waves being recorded are necessary for reasonable fidelity, however, a quite high rate of dot repetition is desirable. This ordinarily means that a multiplicity of styli must contact the record simultaneously, and multiplexing of the signals to the contacting styli is required. The electronic circuits for accomplishing these functions tend to become quite complex and bulky.

The primary object of our invention therefore, is to provide an oscillographic recording system of the electrographic type which avoids most of such complexity, without sacrificing fidelity of response to frequencies ranging from zero to several hundred cycles per second. Briefly enumerated, further objects and advantages of the invention are to provide an electrographic recording system which uses only a few relatively simple electronic circuits, is substantially free from errors or distortion, allows unlimited excursion and overlap of multiple traces within the limits of the width of the record medium, readily accommodates relatively large numbers of multiple traces, and allows quite high dot-repetition rates. Still further objects, uses, and advantages of the invention will become apparent as the description proceeds.

In accordance with our invention, the foregoing and other objects are accomplished by a system wherein a plurality of styli are mounted on the edge of a disk. Rotation of the disk carries the styli transversely across a curved record strip, while the strip is simultaneously being moved lengthwise. As each stylus reaches a position corresponding to the instantaneous amplitude of a signal, an impulse of electric current passes between the stylus and the strip, producing a dot on the strip. The sweeping of the styli in sufficiently rapid succession across the strip produces a succession of such dots closely spaced so as to form a substantially continuous line or trace. Any number of such traces can be recorded by arranging for each stylus to record a corresponding number of dots, each properly placed, in each pass across the record strip.

One or more galvanometers and a photo-electric scanner provide these impulses in the proper time relationship to indicate signal amplitude. Thus, a signal applied to a galvanometer deflects a light beam in proportion to the instantaneous signal amplitude. The scanner rotating in synchronism with the stylus disk carries a number of light-transmitting elements in the same relative angular positions as the styli occupy on the disk. When each such element intercepts the deflected galvanometer beam, it transmits a light impulse from the beam to a photocell. It is this photocell impulse, amplified and applied to the corresponding stylus, which produces a traceforming dot.

In order to provide a high dot-repetition rate, a plurality of styli, scanning elements, and photocells are used simultaneously. Any number may be so used, to increase the dot-repetition rate by the same factor, for a given size and rotational speed of the stylus disk. To accommodate an increased number of galvanometers for multiple-trace recording, an optical system may be interposed in the deflected galvanometer beams such that the galvanometers may be physically separated from each other but be, in effect, superimposed at a point so as to avoid errors or distortion.

This will be better understood by reference to the accompanying drawings forming a part of this application and illustrating certain typical embodiments of the invention.

In these drawings.

Figures 1, 2, 3:
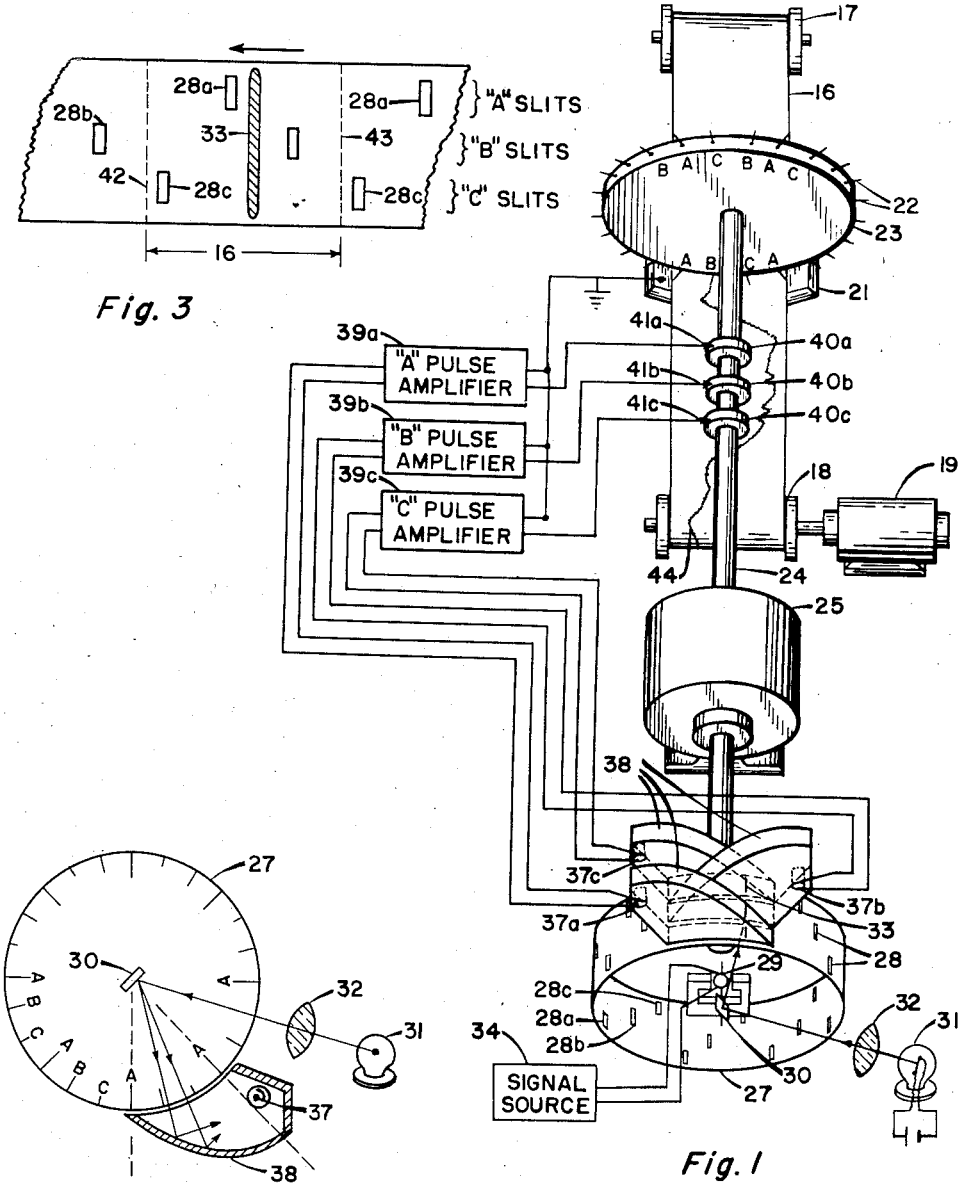
Figure 1 is a view, partially in perspective and partially diagrammatic, of an embodiment of the invention for recording a single trace.
Figure 2 is a view partially diagrammatic and partially in cross-section of the scanner and light collector in Figure 1.
Figure 3 is a diagrammatic view of part of the scanning mechanism of Figure 1.

Referring now to these drawings in detail and particularly to Figure 1 thereof, a record medium 16 in strip form is drawn from a supply spool 17 to a take-up spool 18 driven by a paper drive motor 19 at an appropriate speed. Between the supply and take-up spools 17 and 18, the strip 16 passes over a curved backing plate 21 adjacent the tips of a plurality of styli 22 mounted on the edge of a disk 23. The disk 23 is fastened to the shaft 24 of a motor 25, which is preferably of a constant-speed type, though this is not essential. Also mounted on the motor shaft 24 is a scanning drum 27 containing three rows of apertures 28, the respective rows being designated 28a, 28b, and 28c. The angular separation of the apertures 28 on drum 27 is the same as the angular separation of the styli 22 on disk 23.

The styli 22 may be considered to consist of a number of stylus groups or sets. The styli of each set are electrically insulated from each other, but each is connected to the corresponding stylus in every other set. Thus, each set is made up of a stylus A, a stylus B, and a stylus C. The styli A, B, and C are electrically insulated from each other; but by connections within the disk 23 all of the A styli are connected together; and all of the B styli are interconnected, as are all of the C styli.

There is a corresponding arrangement of the apertures 28 on drum 27. The apertures corresponding to the angular positions of the A styli are located in the aperture row 28a, those for the B styli in row 28b, and those for the C styli in row 28c. Within drum 27, located preferably on its axis, is a galvanometer 29 carrying a mirror 30 which receives light from a line source 31 through a collimating lens 32, and forms a linear beam intercepting the drum 27 along the line 33. A signal to be recorded, received from a signal source 34, is applied by appropriate leads to the coil of galvanometer 29.

In positions to receive light impulses through apertures 28a, 28b, and 28c, respectively, are a plurality of photocells 37a, 37b, and 37c, each supplied with a reflector 38. As appears in Figure 2, the reflector 38 is preferably an ellipsoidal mirror capable of scanning an interval of the drum surface equal to the spacing of the successive apertures in one of the aperture rows, which is the same as the angular span of any one of the stylus sets of disk 23, all of the light impulses received by the mirror 38 being directed to the photocell 37. It will be understood that the mirrors 38 are suitably enclosed so that each photocell receives light impulses from only one of the aperture rows.

By suitable leads the outputs of the photocells 37a, 37b, and 37c, are applied respectively to pulse amplifiers 39a, 39b, and 39c. After amplification of the various pulses to a level sufficient to mark the record 16, the amplifier outputs are applied to slip rings 40a, 40b, and 40c, respectively, by the contacting brushes 41a, 41b, and 41c. As the styli A, B, and C, are respectively connected to the slip rings 40a, 40b, and 40c, the mark-producing impulses transmitted to these styli in succession by the various photocell and amplifier units produce the trace 44 on record 16 by closely spaced dots, while the record strip 16 is being moved lengthwise past these styli over the curved backing plate 21 by the paper-drive motor 19.

The operation of this embodiment may be understood by reference to Figure 3. Dashed lines 42 and 43 represent the limiting angles to which the galvanometer beam in the form of the line 33 may be deflected and still be transmitted to one of the photocells 37 by the mirror 38. This also corresponds with the angular width of strip 16, or at least of that portion of the strip with which the styli 22 maintain contact as they are carried across the strip by the rotation of disk 23.

As the disk 23 rotates clockwise, the styli A, B, and C, are carried across the face of strip 16 in that order. The corresponding rotation of the scanning drum 27 carries the apertures 28 past the deflected light beam 33 in the same order. Thus, a segment of the scanning drum as shown in Figure 3, moving in the direction of the arrow, causes the apertures 28a, 28b, and 28c, to cross the deflected galvanometer beam 33 in that order. As the angular positions of these apertures on drum 27 correspond to the angular positions of the similarly designated styli on disk 23, it is believed clear that all of the styli will place their respective dots in line with each other to produce the trace 44. Movement of the beam 33 anywhere between the limits 42 and 43 causes a similar deflection of the trace 44 across the width of strip 16.

Figure 5:
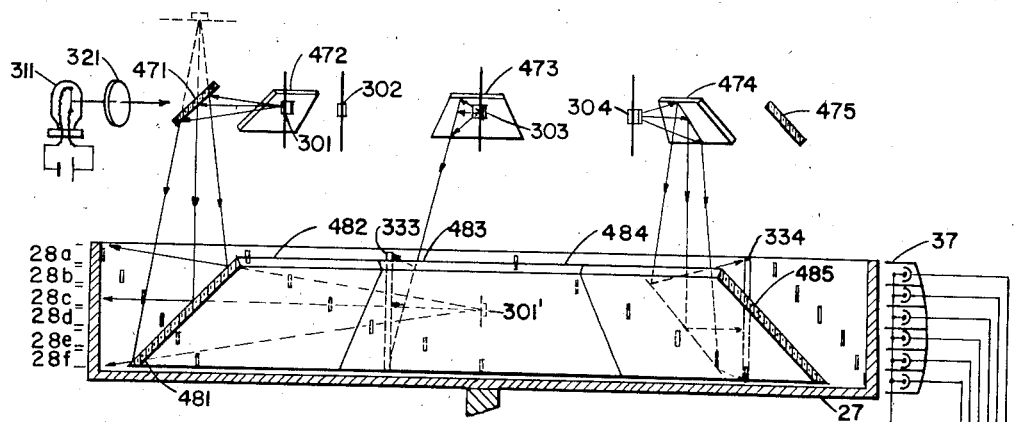
Figure 5 is a cross-section view of the scanning and optical system of Figure 4 on the lines 5—5.
Figure 4:
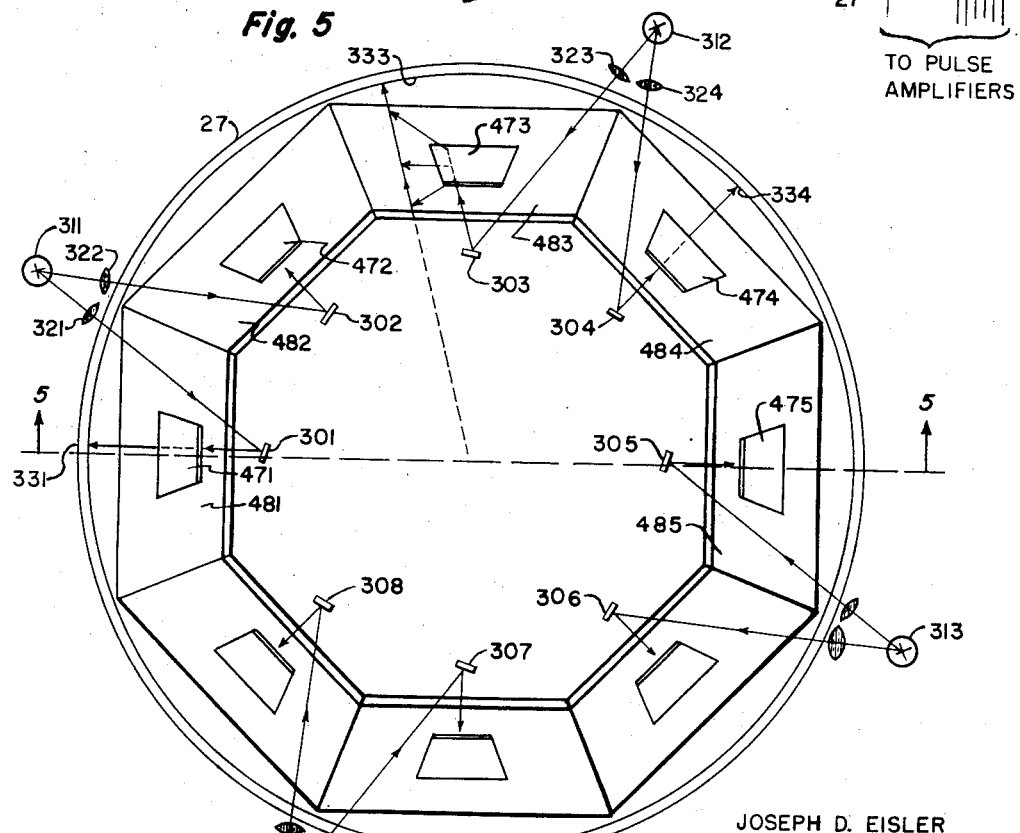
Figure 4 is a plan view of an optical system for use in scanning the beams of a plurality of galvanometers.

In the embodiment just described distortion or errors in scanning the position of the galvanometer beam are avoided due to the fact that the axis of rotation of the drum 27 and of the galvanometer mirror 30 are the same. When several galvanometers are used simultaneously for producing a multiple-trace recording, locating all of them simultaneously on the axis of rotation of the drum presents obvious difficulties. If only two or three galvanometers are to be used, they may perhaps be placed side-by-side and close together on the drum axis, the closeness of the spacing being effective to minimize the error or distortion due to one or more of the galvanometer mirrors being offset from the drum axis. For a large number of galvanometers and a reasonable size of the scanning drum 27, however, the error or distortion due to a galvanometer being off-center may not be negligible. In Figures 4 and 5 is shown an embodiment of the invention wherein a plurality of galvanometers may be separated in space, while an optical system directs their respective deflected beams onto the scanning drum surface in the same way as if all galvanometers were located exactly at the drum axis.

If Figure 4 is regarded as a vertical elevation view and Figure 5 as a horizontal cross-section, then, as these figures show, eight galvanometers 301–308 for recording eight traces on a multiple-trace record are distributed evenly around a circle concentric with the axis of drum 27 but axially displaced therefrom. Two plane mirrors parallel to and facing each other are so placed as to intercept the galvanometer deflected beams, sending them onto the drum scanning surface where they pass through the six aperture rows 28a–28f onto a bank of six photocells 37. Thus, the deflected beam of galvanometer mirror 301, for example, is reflected through an angle of approximately 90° by the mirror 471 and then through a reverse angle of approximately 90° by the mirror 481 onto the scanning drum surface. By proper choice of the separation of mirrors 471 and 481 and proper placement of the galvanometer mirror 301, the virtual image 301' of this galvanometer mirror can be placed exactly on the drum axis as shown in Figure 5, so that the beam strikes the scanning surface of drum 27 as if the mirror were located on this axis. Thus, regardless of the angular position of the galvanometer mirror 301, as long as its beam is reflected by the two mirrors 471 and 481, its deflected beam will impinge upon the apertures 28 as though it were located at the drum axis. Other pairs of plane mirrors, similarly positioned with respect to the other galvanometers 302–308, reflect their respective deflected beams onto the scanning surface of drum 27 in the same way as if every one of the mirrors 302–308 was similarly located at the drum axis. For example, the deflected beam from mirror 303 is reflected by mirrors 473 and 483 to the scanning surface of drum 27 as a line 333, where it is intercepted by the drum apertures 28. Likewise, the deflected beam of mirror 304 is transmitted by mirrors 474 and 484 to the position 334 on the drum surface.

It will be understood that the showing of Figures 4 and 5 is diagrammatic to the extent that the supporting structure for the various mirrors, galvanometers, and light sources, which holds them stationary and in fixed relation to each other while the drum 27 is rotating rapidly, is omitted. Likewise, the showing of the photocells 37 for scanning the various aperture rows 28a–28f is highly schematic, and it is to be understood that proper light-collecting means, which will be subsequently described in greater detail, are present for directing the light impulses transmitted by the apertures 28 to the proper photocells, regardless of the angular position of these apertures when intersecting one of the galvanometer beams 33.

Figure 9:
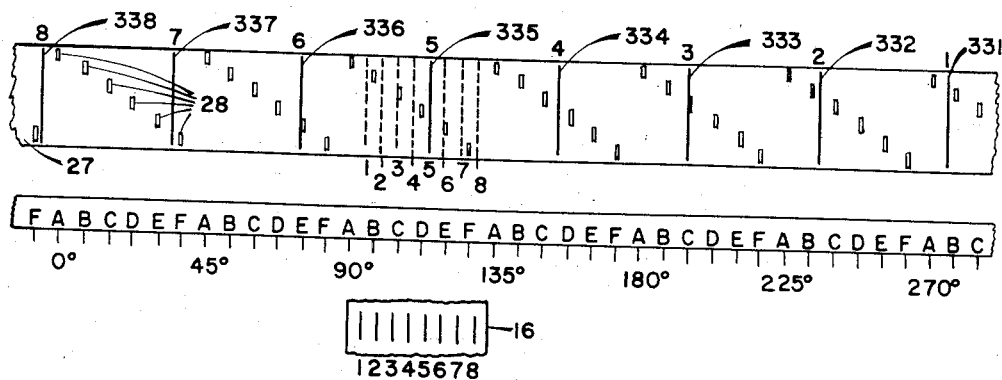
Figure 9 is a diagrammatic view of the scanning and recording elements of Figures 4 to 8.

The operation of this embodiment may be understood by reference to Figure 9 which shows the edge of stylus disk 23 and the drum portion of scanner 27 as they would appear if stretched out on a flat surface. Also shown in Figure 9, correlated in position with the A styli of the disk 23, is a short length of the record strip 16 on which the zero or rest positions of the eight traces are shown as short solid lines. Referring to the angle markings adjacent the linear representation of disk 23, the width of strip 16 and the length of a stylus set are seen to be 45°. The space between adjacent styli in each set, composed of six unconnected styli, is thus 7.5°. The adjacent apertures 28 of scanning drum 27 are similarly 7.5° apart. When these apertures are offset into six rows 28a–28f, the apertures in each row are 45° apart, the same as the corresponding styli to which the electrically amplified impulses from the apertures are transmitted.

By adjusting the rest positions of the various galvanometer beams to the positions 331–338 shown in Figure 9, with each beam rest position falling in a different set of apertures, the desired spacing of the traces across the record 16 can be achieved. Thus, the dashed lines numbered 1 to 8 adjacent the beam position 335 are the effective beam positions, as regards location of the traces on record 16, for the actual positions 331–338 in the different aperture sets. In this case, for example, the angular locations of the various beam rest positions 331–338 are 40° apart around the drum 27.

Figure 6:
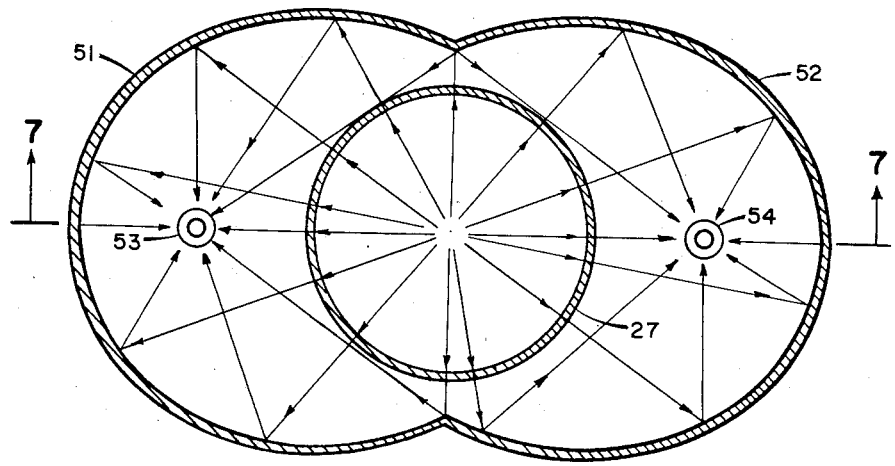
Figure 6 is a diagrammatic cross-section view of light collecting means for the scanning device of Figures 4 and 5.
Figure 7:
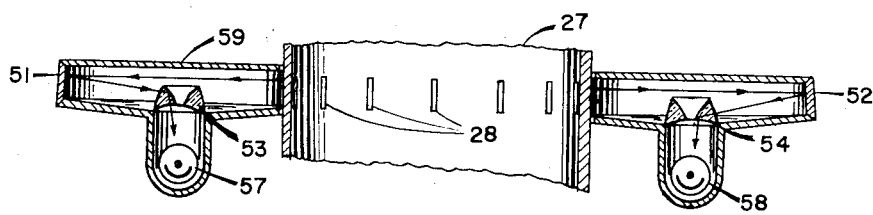
Figure 7 is a cross-section view of the device of Figure 6 on the lines 7—7.
Figure 8:
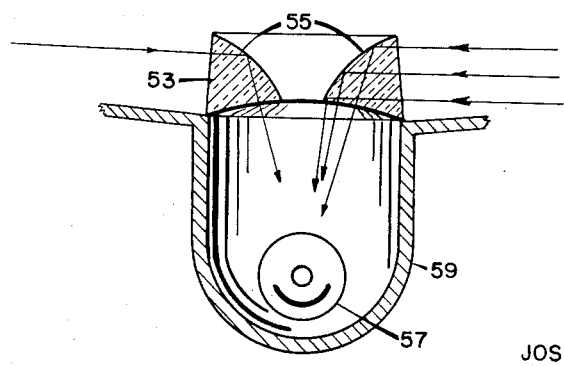
Figure 8 is a detailed cross-section view of a light-collecting element.

In connection with Figure 5, it was stated that light impulses from each row of apertures 28a–28f are directed to one of the photocells of photocell bank 37, regardless of the angular position of the aperture when it intersects a deflected galvanometer beam. Figures 6, 7, and 8 illustrate one means by which this may be accomplished. Thus, as is shown in Figures 6 and 7, the apertures 28 of any given row on the drum 27 transmit light impulses to one or the other of two ellipsoidal mirror surfaces 51 and 52, which together completely surround the drum 27. The drum axis constitutes one focal point of the mirror 51, while at the other focal point is located a light-collecting element 53. Similarly, the ellipsoidal mirror surface 52 also has the drum axis as one focal point and a light-collecting element 54 at the other. As is shown more clearly in Figure 7, the light collector 53 directs light impulses from any point of the mirror 51 onto the photocell 57, while the collector 54 similarly directs light impulses from the ellipsoidal mirror 52 onto the photocell 58. Both of the photocells 57 and 58 are connected in parallel to the same photocell amplifier.

It will be understood that the showing of eight galvanometers and six photocell amplifying channels and six styli per set is by way of example only. There is no connection whatever between the number of signal traces which may be recorded and the number of styli and photocell channels required to do this recording. By placing the galvanometer mirrors 301, 302 etc., closer together in a circle around the drum axis, more than eight galvanometers can be accommodated, and thus more than eight signal traces can be recorded. Each such galvanometer position of course requires the two additional plane mirrors such as 471 and 481. In this particular example, if a drum speed of 3600 revolutions per minute be assumed, it will be apparent that the dot-repetition rate for each trace is such that 2880 dots per second are recorded. Thus, frequencies from zero up to as much as 200 cycles per second or more can be recorded with good fidelity.

Figure 10:
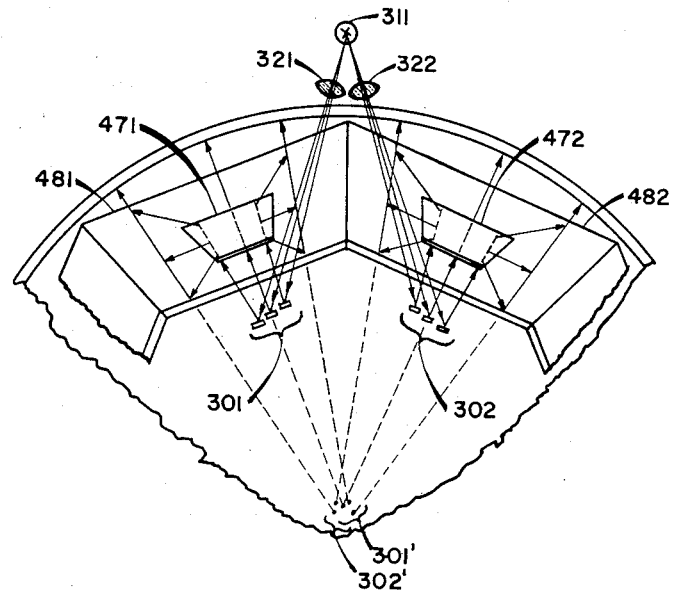
Figure 10 is a partial view, similar to Figure 4, of a modification of the device of Figure 4 for an increased number of multiple traces.

As appears in Figure 10, instead of using an increased number of galvanometer positions, each galvanometer position can be occupied by two or more galvanometer mirrors placed close together. Thus, three small, closely spaced galvanometer mirrors may be located at the galvanometer position 301, while three other galvanometers are at the position 302. The virtual images 301' and 302' of these mirror positions at the center of the drum are similarly closely spaced, so that the scanning error or distortion due to two of the mirrors being slightly off-center is small enough to be negligible. Thus, it will be seen that the system of Figures 4 and 5 can be easily modified to record at least 24 traces simultaneously. In view of Figure 9, it will be apparent how the rest positions of the various galvanometer beams from the three-element clusters 301 and 302 of Figure 10 can be placed to give the desired trace positions on the record strip 16.

In place of the apertures 28 as light-transmitting elements, it will be understood that light-reflecting elements could be carried by the scanning drum surface to reflect the galvanometer beams to a centrally located photocell near the drum axis. Also, other arrangements of the mirror system are possible by which virtual images of the galvanometer mirrors can be obtained on the drum axis. Also, it will be apparent how almost any desired dot-repetition rate can be obtained by varying the spacing of the styli and scanning apertures and the number of photocell amplifying channels.

While we have thus described our invention in terms of the foregoing specific embodiments and modifications thereof, it is to be understood that the scope of the invention is not limited to the details described but is properly to be ascertained from the scope of the appended claims.

We claim:

1. A system for oscillographic recording on an electrosensitive record strip comprising, in combination, a plurality of stylus sets each of a length at least as great as the portion of the strip width to be contacted, each set comprising a plurality of spaced styli electrically insulated from each other and each stylus of each set being electrically connected to the one correspondingly placed stylus in every other set, means for moving said styli in a circular path, means for moving said strip lengthwise and perpendicular to said path, means for curving said strip and maintaining contact between its surface and the ends of said styli for a major portion of the strip width, means for producing a light beam, means for deflecting said beam in accordance with a signal to be recorded, a mask rotatable in synchronism with the movement of said styli to carry in succession across said beam, as deflected, a plurality of light-transmitting elements, there being for each of said styli one of said elements at the same relative angular position on said mask as the corresponding stylus occupies in said path, said elements being arranged in a plurality of parallel rows equal in number to the number of styli per set and all of the elements of each row corresponding to the electrically connected styli occupying one position within said sets, a plurality of photocells, there being at least one photocell for each one of said element rows positioned to receive the successive light impulses transmitted by the elements of said one row as they pass in succession through said deflected beam, a plurality of amplifiers, each connected to receive the photocell output electrical pulses produced by one of said element rows, for amplifying said pulses to a strip-marking power level, and electrical connection means for applying the output pulses of each of said amplifiers to the corresponding appropriate one of said plurality of styli to mark said strip.

2. A system for oscillographic recording on an electrosensitive record strip comprising, in combination, a disc, means for rotating said disc, a plurality of styli mounted on the edge of said disc, said styli forming a plurality of stylus sets each of a length at least as great as the portion of the strip width to be contacted, each set comprising a plurality of spaced styli electrically insulated from each other, and each stylus of each set being electrically connected to the one correspondingly placed stylus in every other set, means for moving said strip lengthwise perpendicular to the plane of said disc, means for curving said strip and maintaining contact between its surface and the ends of said styli as they sweep across a major portion of the strip width, means for producing at least one light beam, at least one galvanometer for deflecting said beam in accordance with a signal to be recorded, a mask rotatable in synchronism with the movement of said styli to carry in succession across said beam, as deflected, a plurality of apertures, there being one aperture for each of said styli at the same relative angular position on said mask as the corresponding stylus occupies on said disc, said apertures being arranged in a plurality of parallel rows equal in number to the number of styli per set and all the apertures of each row corresponding to the electrically connected styli occupying one position within said sets, a plurality of photocells, there being at least one for each of said aperture rows, reflecting means for directing light impulses transmitted by the apertures of each row to at least one of said photocells associated with said row, a plurality of amplifiers, each connected to receive the output electrical pulses of all photocells associated with one aperture row, for amplifying said pulses to a strip-marking power level, and electrical connection means for applying the output pulses of each of said amplifiers to the corresponding appropriate one of said plurality of styli to mark said strip.

3. A system in accordance with claim 2 wherein there are a plurality of galvanometers each of which deflects a light beam in accordance with one of a plurality of signals to be recorded as one of a plurality of traces, and including at least one optical system for projecting each deflected beam onto said mask as if said beam had come from the axis of rotation of said mask.

4. A system in accordance with claim 3 wherein said optical system comprises two plane mirrors parallel to and facing each other so as to reflect each beam through two equal but opposite angles.

5. A system in accordance with claim 3 wherein there are a plurality of optical systems and galvanometers separated in space and arranged around the axis of rotation of said mask, said galvanometers being oriented so that the rest positions of their deflected beams fall at different locations in the different sets of apertures corresponding to the different sets of styli.

6. A system in accordance with claim 5 in which there are a plurality of galvanometers deflecting a plurality of light beams onto said mask through each optical system, all the galvanometers for each optical system being grouped closely together.

7. A system as in claim 2 wherein said reflecting means comprises at least one elliposidal mirror having as focal points a photocell and the axis of rotation of said mask, respectively.

8. A system as in claim 7 including means at the photocell focal point for directing light impulses arriving over a substantial range of directions into a narrow beam impinging on said photocell.

No references cited.